US009132915B2

United States Patent
Zhu

(10) Patent No.: US 9,132,915 B2
(45) Date of Patent: Sep. 15, 2015

(54) MULTI-MODAL VEHICLE

(75) Inventor: Jianchao Zhu, Athens, OH (US)

(73) Assignee: Ohio Univeristy, Athens, OH (US)

(*) Notice: Subject to any disclaimer, the term of this patent is extended or adjusted under 35 U.S.C. 154(b) by 160 days.

(21) Appl. No.: 13/696,699

(22) PCT Filed: May 9, 2011

(86) PCT No.: PCT/US2011/035746
§ 371 (c)(1),
(2), (4) Date: Jan. 18, 2013

(87) PCT Pub. No.: WO2011/140551
PCT Pub. Date: Nov. 10, 2011

(65) Prior Publication Data
US 2013/0112804 A1 May 9, 2013

Related U.S. Application Data

(60) Provisional application No. 61/332,247, filed on May 7, 2010.

(51) Int. Cl.
*B64C 37/00* (2006.01)
*B64C 29/00* (2006.01)

(52) U.S. Cl.
CPC ............. *B64C 37/00* (2013.01); *B64C 29/0025* (2013.01); *B64C 29/0033* (2013.01)

(58) Field of Classification Search
CPC .......... B64C 3/56; B64C 11/00; B64C 27/20; B64C 29/00; B64C 29/0033; B64C 37/00; B64C 39/00; B64C 39/12
USPC ........... 244/2, 7 R, 10, 12.1, 12.3, 12.4, 12.5, 244/23 A, 23 B, 50, 17.23, 45 A
See application file for complete search history.

(56) References Cited

U.S. PATENT DOCUMENTS 2,702,680 A * 2/1955 Heinemann et al. .......... 244/140
3,063,655 A 11/1962 Skavinsky
(Continued)

FOREIGN PATENT DOCUMENTS

GB 788643 1/1958

OTHER PUBLICATIONS

International Search Authority, International Search Report and Written Opinion of PCT Patent Application No. PCT/US2011/035746, dated Aug. 12, 2011, (12 pages).

*Primary Examiner* — Christopher P Ellis
*Assistant Examiner* — Christopher Hutchens
(74) *Attorney, Agent, or Firm* — Wood, Herron & Evans, LLP

(57) ABSTRACT

A multi-modal vehicle ("MMV") 20*a*-20*d*. The MMV 20*a*-20*d* includes a fuselage 22 and a chassis 26 supporting at least three wheels 44 having deployed and stowed states. Extending away from the fuselage 22 is a canard wing system 28 and a main wing system 30. The main wing system 30 includes an inboard portion 134 and an outboard portion 132. The inboard portion 134 is pivotally connected to the fuselage 22; the outboard portion 132 is pivotally connected to the inboard portion 134. The MMV 20*a*-20*d* further includes a vertical thrust system 32 comprising a pair of ducted fans 100 that are incorporated into the fuselage 22, and a dual-use thrust system 34 that is configured to transition between a first position for supplying vertical thrust and a second position for supplying a horizontal thrust. A controller 42 is configured to control the MMV operations, reconfigurations, or transitions.

29 Claims, 13 Drawing Sheets

(56) References Cited

U.S. PATENT DOCUMENTS

| | | |
|---|---|---|
| 5,407,150 A | 4/1995 | Sadleir |
| 6,517,026 B1 | 2/2003 | Smith |
| 6,745,977 B1 * | 6/2004 | Long et al. .................. 244/2 |
| 2003/0062442 A1 | 4/2003 | Milde, Jr. |
| 2003/0094536 A1 * | 5/2003 | LaBiche .................. 244/2 |
| 2009/0008510 A1 * | 1/2009 | Posva .................. 244/7 R |
| 2009/0159757 A1 * | 6/2009 | Yoeli .................. 244/23 A |
| 2009/0218440 A1 * | 9/2009 | Dilmaghani et al. .......... 244/50 |

* cited by examiner

MULTI-MODAL VEHICLE

FIELD OF THE INVENTION

The present invention relates generally to multi-modal vehicles.

BACKGROUND OF THE INVENTION

Vehicles that are operable in various modes have been a desire since the Wright brothers' first flight. In one example, a multi-modal vehicle ("MMV") could be configured to drive on- and off-road like a Sports Utility Vehicle ("SUV"), transform into a Vertical Take-Off/Land aircraft ("VTOL," for example, a helicopter), and transition, in flight, into a fast and efficient cruise, fixed-wing aircraft. In another example, an SUV could transform into a watercraft. The ability to transition between SUV and aircraft and/or watercraft opens a wide range of possibilities for the future of civilian travel and would be of great military advantage.

However, there are several technological challenges to overcome in creating such an MMV. Some efforts have been made in this area; however, known conventional MMVs lack fully automated, true multi-modal functionality. These known MMVs are in essence, an assemblage of the various components of each desired vehicle type, where one or more components are retrofitted to the MMV. Therefore, the known MMVs that have been reduced to practice are predominately a land vehicle with some aircraft functionalities or vice versa. Other known MMV designs are only concepts on paper due to technical challenges, such as: (1) an inability to incorporate all functional components of an MMV into a single vehicle under the stringent size and weight constraints; (2) lack of sufficient control or inability to maintain stability in the VTOL configuration and during transition to the aircraft configuration; (3) safety concerns during this transition and/or propulsion failures; and (4) fuel inefficiency.

Thus, there remains a need for an MMV design that integrates the various functionalities of various modes of travel in a unique and novel way that is fully automated, safe, and fuel efficient.

SUMMARY OF THE INVENTION

The present invention overcomes the foregoing problems and other shortcomings, drawbacks, and challenges of developing a truly multi-modal vehicle. While the invention will be described in connection with certain embodiments, it will be understood that the invention is not limited to these embodiments. To the contrary, this invention includes all alternatives, modifications, and equivalents as may be included within the spirit and scope of the present invention.

In accordance with one embodiment of the invention, a multi-modal vehicle ("MMV") is described. The MMV includes a fuselage and a chassis supporting at least three wheels. Extending away from the fuselage is a canard wing system and a main wing system. The main wing system includes at least two wings, each comprised of an inboard portion and an outboard portion. The inboard portion is rotatably coupled to the fuselage; the outboard portion is rotatably coupled to the inboard portion. The MMV further includes a first vertical thrust system comprising a pair of ducted fans that are incorporated into the fuselage, and a dual-use thrust system that is coupled to a rear portion of the fuselage and configured to transition between a first position for supplying vertical thrust and a second position for supplying a horizontal thrust.

According to another embodiment of the invention, a foldable wing system is described. The foldable wing system includes an inboard portion and an outboard portion. The inboard portion is rotatably coupled to a fuselage and the outboard portion is rotatably coupled to the inboard portion. Each of the inboard and outboard portions includes a moveable split trailing edge and a leading edge. The leading edge is configured to create vortices that induce lift.

In accordance with yet another embodiment of the invention, a method of transitioning an aircraft from a vertical takeoff to an airborne in-flight cruise is described. The method includes supplying first and second vertical thrusts. The first vertical thrust is supplied from a vertical thrust system and the second thrust is supplied from a dual-use thrust system. A vectored thrust is provided to transition the second vertical thrust from the dual-use thrust system to a horizontal thrust from the dual-use thrust system. The first vertical thrust may then be terminated.

In still another embodiment of the invention, a method of transitioning an aircraft from an airborne in-flight cruise to a vertical landing is described. The method includes providing a vectored thrust that transitions a horizontal thrust from a dual-use thrust system to a vertical thrust from the dual-use thrust system. A second vertical thrust is also provided from a vertical thrust system.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

Figure 1:
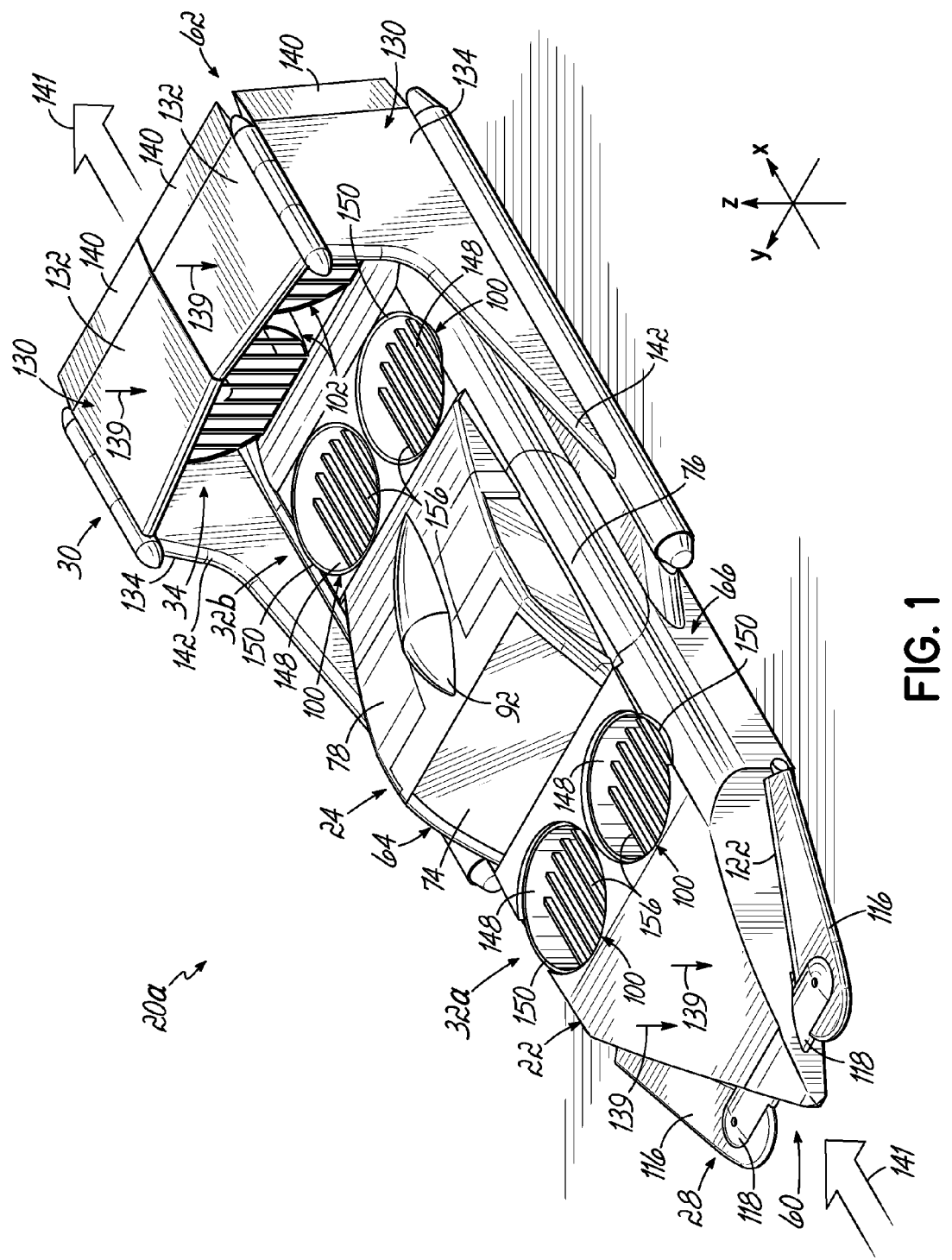
FIG. 1 is an isometric view of a multi-modal vehicle in accordance with one embodiment of the invention, illustrated in a roadable configuration.
Figure 2A:
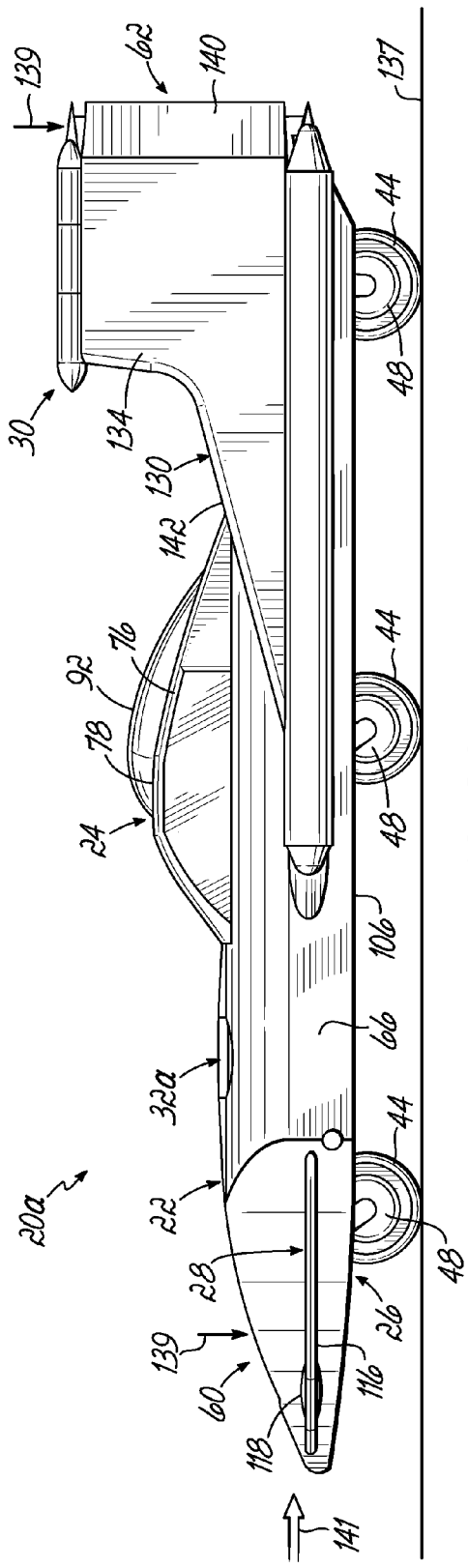
FIG. 2A is a side-elevational view of the multi-modal vehicle of FIG. 1.

Turning now to the figures, and in particular FIGS. 1, 2A, 2B, 7 and 8, an MMV 20a-20d in accordance with one embodiment of the invention is described. The MMV 20a-20d provides a synergistic integration of key components and functionalities of each type of vehicle and is based on a holistic analysis and synthesis of fundamental principles to enable the desired functionalities. As shown in FIGS. 1 and 2A, the MMV 20a-20d is configured to be a roadable vehicle ("roadable configuration" 20a), which may operate and function in manner that is similar to an SUV.

Figure 9:
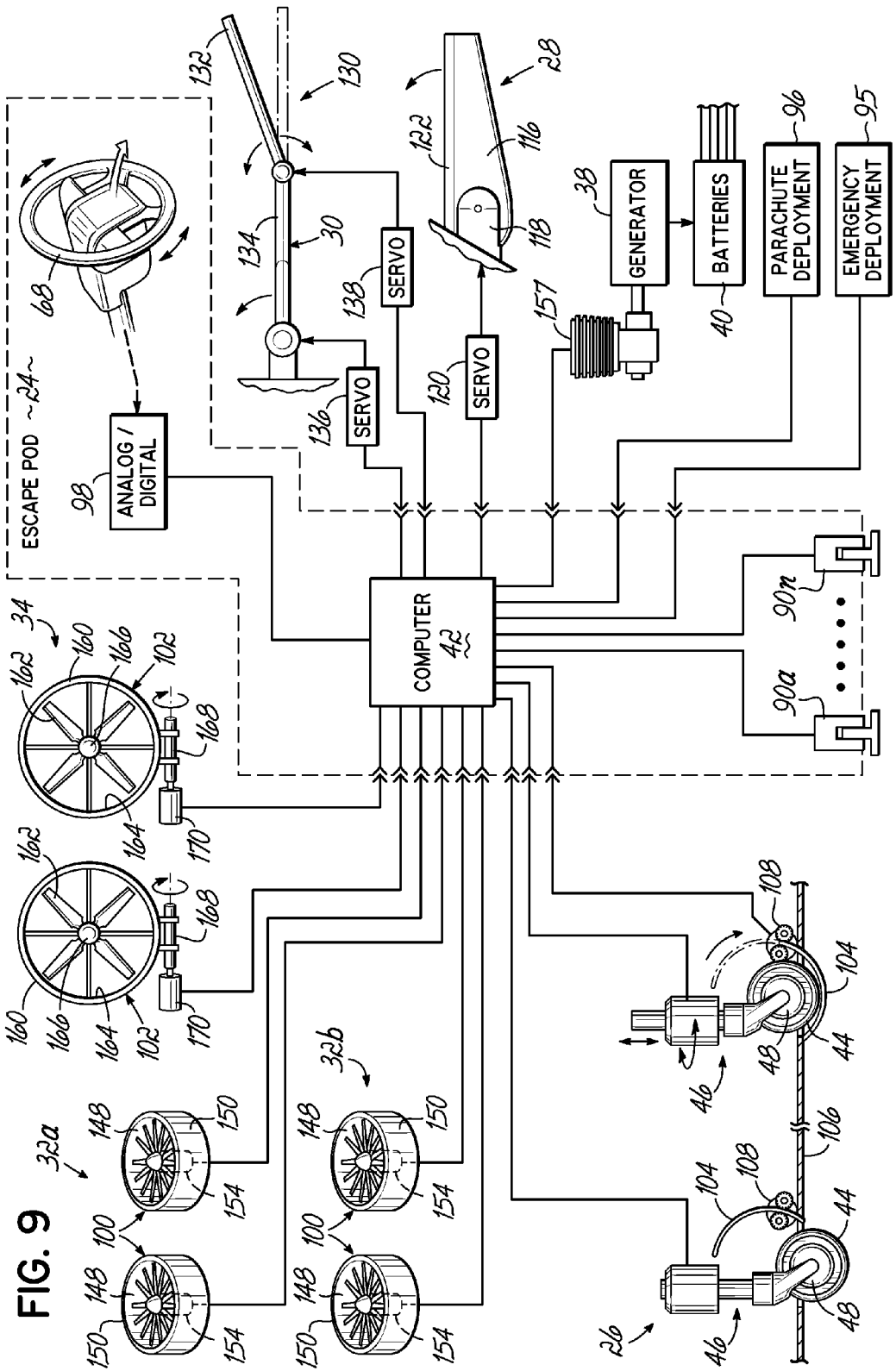
FIG. 9 is a schematic illustration of operational components of a multi-modal vehicle in accordance with one embodiment of the invention.

Generally, the MMV 20a-20d includes a fuselage 22 having a passenger cabin 24 that is also releasable from the remaining portion of the fuselage 22 as an escape pad in case of an emergency (for convenience of description it is referred to either as "cabin 24" or "escape pod 24," as appropriate within the context), a chassis 26 (FIG. 3), a canard wing system 28, a main wing system 30, one or more vertical thrust systems (though two vertical thrust systems 32a, 32b are shown), one or more dual-use thrust systems 34, and a power plant (shown in FIG. 9 as including a generator 38, one or more batteries 40, and a computer 42). The chassis 26 includes the main landing gear, which may include the surface wheels 44 (FIG. 3), a suspension system 46 (FIG. 3), as well as other related components. For illustrative convenience, the fuselage 22 will be referred to as including a front 60, a rear 62, a right (or passenger) side 64, and a left (or driver) side 66. Additionally, x, y, and z positioning axes are shown and comprise a Cartesian coordinate system with mutually orthogonal axes that supplies at least three degrees of freedom for directional reference with respect to the MMV 20a-20d. However, it is understood that various other frames of reference may be employed for describing the MMV 20a-20d.

The fuselage 22 may be designed with a low speed airfoil profile having a rounded triangular-shaped nose, which, together with the highly-swept wing strakes may aid in producing lift-augmenting Leading Edge Vortices ("LEVs") as described in detail below. Construction materials may include, for example, carbon-fiber composites, fiberglass composites, KEVLAR fabrics, or other like, light-weight materials.

Figure 4:
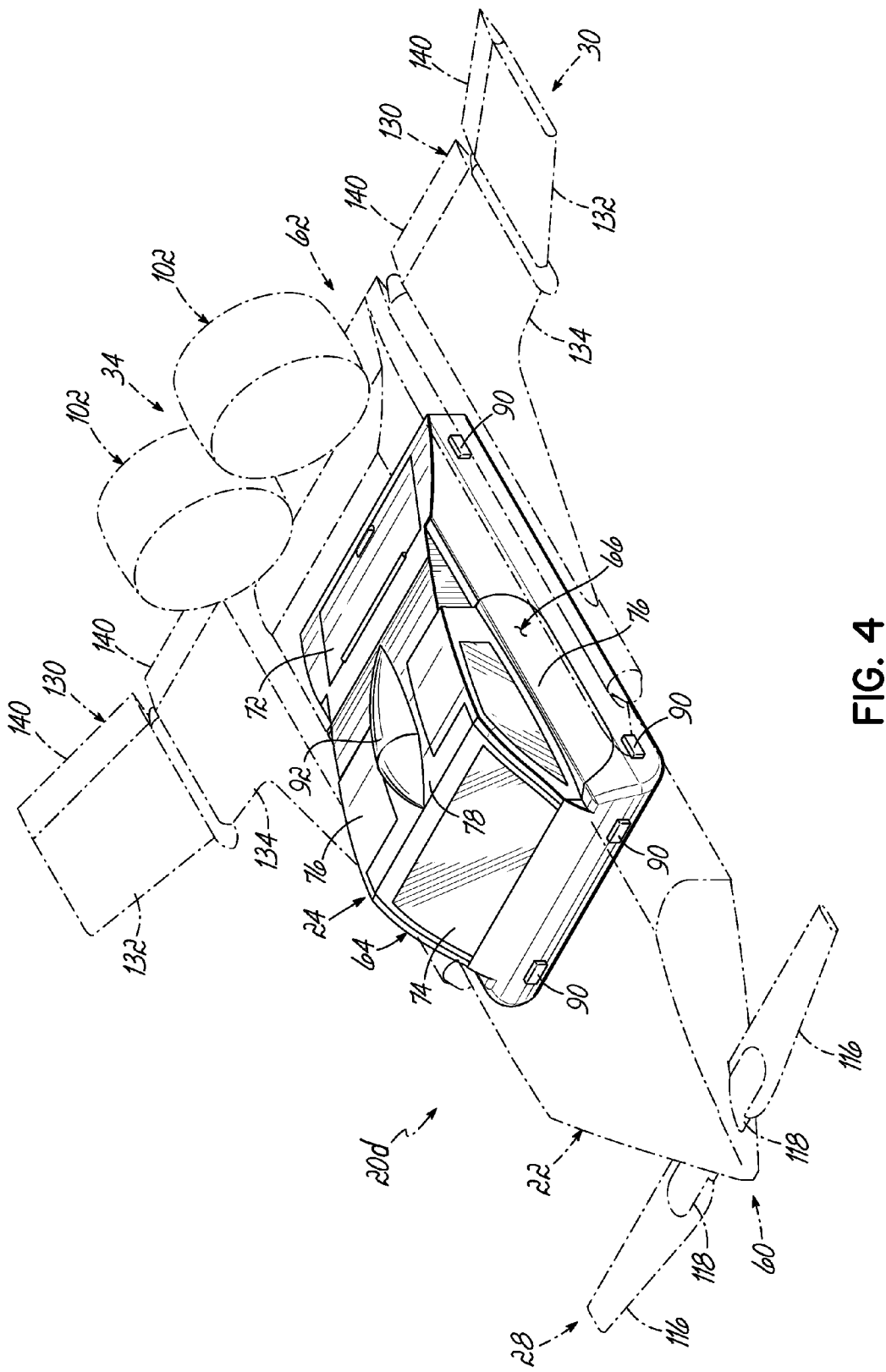
FIG. 4 is an isometric view of a passenger cabin that may be released as an escape pod with the multi-modal vehicle environment shown in phantom.
Figure 5:
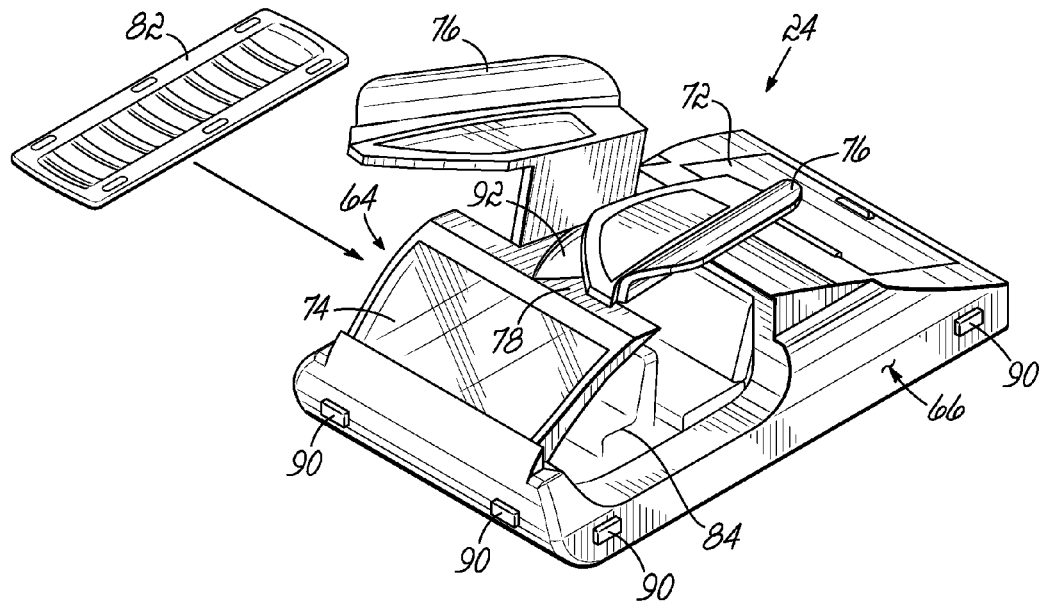
FIG. 5 is an isometric view of the passenger cabin/escape pod of FIG. 4.
Figure 6:
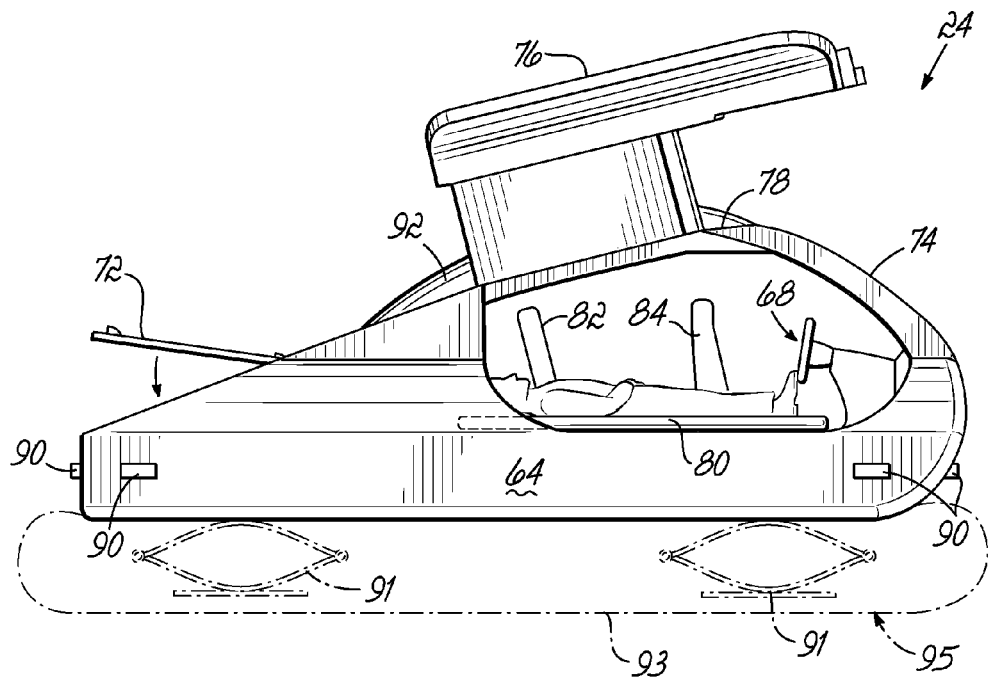
FIG. 6 is a side-elevational view of the passenger cabin/escape pod of FIG. 4.

Referring still to FIG. 1 and also now to FIGS. 4-6, further details of the cabin 24 are provided. The cabin 24 is configured to transport one or more passengers within the MMV 20a-20d and includes a control panel 68 therein for providing at least one of the passengers with operational control of the MMV 20a-20d. For convenience, the cabin 24 will be described in accordance with the illustrated embodiments for accommodating four passengers; however, this description should not limit the scope of the invention. According to this embodiment, the cabin 24 includes four seats (one rear seat 82 and one front seat 84 are shown), which may be foldable and/or translatable within the space contained by the cabin 24 for arranging the seating as desired. It would be understood that an cabin 24 that is configured to seat two passengers could, instead, be manufactured with smaller dimensions than the four-seater, which may reduce the size of the fuselage 22, decrease the overall weight of the MMV 20a-20d, and improve fuel efficiency.

The cabin 24 includes a rear storage space 70 that is accessible through an external door 72 from outside and also generally from inside the cabin 24. The rear storage space 70 and the overall structure of the cabin 24 may be configured to support emergency medical equipment, battlefield supply cargo, reconnaissance and/or surveillance instruments, or up to 1000 lbs of deployable munitions in unmanned operations that are either remotely piloted or remotely commanded.

The cabin 24, as shown, further includes a windshield 74 and two gull-wing style doors 76, which are configured to open by rotating about the roof 78. The doors 76 may be sized and shaped such that all passengers may simultaneously ingress or egress the MMV 20a-20d from a standing posture. Further, the doors 76 may also be sized and shaped to accommodate the transport of a gurney 80 or other oversized medical equipment for transport of injured persons. When the gurney 80 is loaded into the cabin 24, the front and rear foldable seats 84, 82 on the right sides of the cabin 24 are folded such that the gurney 80 may slide onto the rear surface of the backs of the folded seats 82, 84 while the caregiver can tend to or otherwise treat the patient from the left rear seat 82. Other seats, including the front driver/pilot seat 84, may remain upright for operation and comfort of the driver/pilot.

The control panel 68 within the cabin 24 may include a unified operator controller for operating the MMV 20a-20d in each mode or configuration. For example, according to one embodiment, the acceleration and deceleration of the MMV 20a-20d may be controlled by foot pedals when driving on the road or cruising in the air. A steering wheel may control (automatically banked and coordinated) turns when driving on the road or cruising in the air. Climbing or gliding in flight may be controlled by pulling or pushing the steering wheel, respectively. If so desired, the steering wheel may be replaced with a joystick or other similar steering mechanism.

The cabin 24 is constructed so as to disengage from the remainder of the fuselage 22 as an escape pod 24 during a catastrophic event and may be accomplished in one of two ways: complete detachment and flexibly linked detachment. Complete detachment occurs after an in-flight catastrophic failure of the MMV 20a-20d and may include detonation of strategically positioned ballistics 90 around the outer surface of the escape pod 24. In this way, when the ballistics 90 are activated, the escape pod 24 is detached and upwardly released from the remaining portions of the fuselage 22. The ballistics 90 may include, for example, an explosive latch. A compartment 92 positioned on the roof 78 of the escape pod 24 contains a parachute (not shown), which may be released and deployed (Block 96; FIG. 9) after complete detachment of the escape pod 24 and to facilitate a smooth and safe landing.

Though not shown, the landing may be further facilitated by an emergency deployment system 95 that includes one or more shock absorbing suspension springs 91 and/or airbags 93 that are coupled to the bottom portion of the escape pod 24. Under normal operation, the suspension springs 91 and inflated air bags 93 are stowed between the escape pod 24 and the chassis 26; however, during complete detachment, the suspension springs 91 first help to separate the escape pod 24 and the chassis 26, and then the escape pod 24 with the suspension springs 91 are released from the chassis 26. In this way, the suspension springs 91 and inflated air bags 93 may soften the escape pod's landing.

Flexibly linked detachment may be used in the case of an imminent roadable frontal collision or low altitude vertical collision due to a crash landing. During flexibly linked detachment, the ballistics 90 are activated but the suspension springs 91 remain coupled to both the chassis 26 and the escape pod 24. In this way, some of the impact energy may be redirected, or otherwise absorbed, to further protect the passengers.

Returning now again to FIGS. 1-2B, additional details of the MMV 20a-20d are provided. Because the conventional mechanical structure of roadable vehicles, such as the steering column and mechanical drive train, add significant weight to roadable vehicles, the MMV 20a-20d includes "by-wire" operational technologies, i.e., drive-by-wire, steer-by-wire, thrust-by-wire, brake-by-wire, and so forth. The by-wire operational mechanisms are generally known and provide electronic-based control systems such that a vehicle is operated with conventionally known manipulations, whereby the mechanical manipulation of a steering wheel is converted into electronic signals (analog/digital converter 98; FIG. 9) that operate the rotational direction of at least the front and rear wheels 44 (illustrated by directional arrows 94). The elimination of the mechanical couplings between the control panel 68 and computer 42 and the functions of the MMV 20a-20d also facilitates the deployable nature of the escape pod 24.

Figure 3:
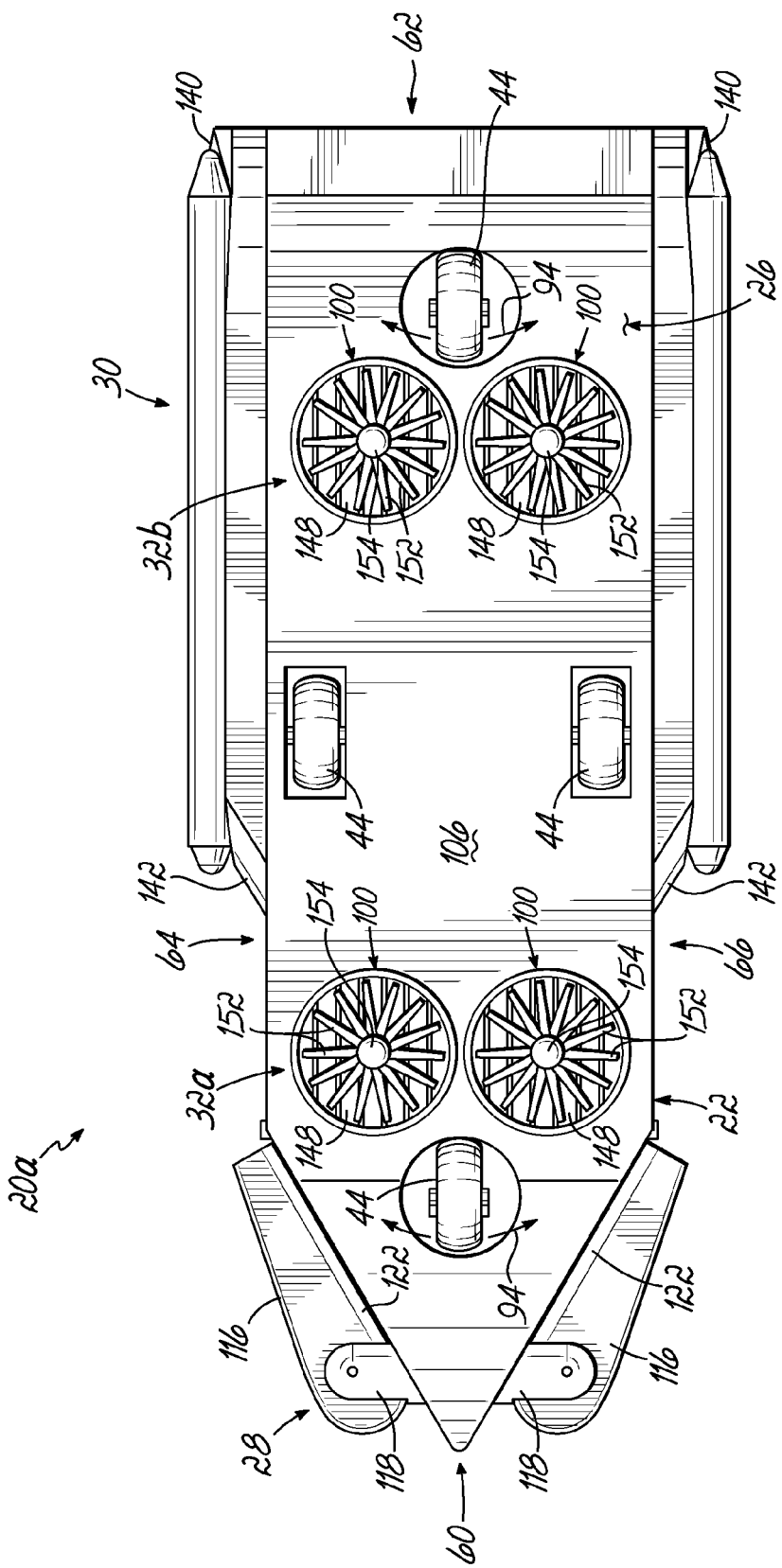
FIG. 3 is a bottom view of the multi-modal vehicle of FIG. 1.

In the roadable configuration 20a of FIGS. 1, 2A, and 3 and with reference to FIG. 9, the MMV 20a-20d is a four wheel drive vehicle having four wheels 44 operable by four 25 kW (34 HP) or larger electric hub motors 48, such as those that are generally known in the art. Each electric hub motor 48 is configured to rotate each wheel 44 and to generate longitudinal propulsion. Each electric hub motor 48 may be further associated with a motor controller (not shown), a cooling system (not shown), a retractable suspension system 46 (FIG. 9), and appropriate electromechanical actuators, such as servo-actuators, for operating the drive-by-wire, the brake-by-wire, and the steer-by-wire mechanisms. However, other types of actuators may be used, including MEMS devices, shape memory alloy devices, piezoelectric devices, and electro-strictive or magneto-strictive devices. In some embodiments, the hub motors 48 may be used in a regenerative braking mode by which kinetic energy may be recovered.

The wheels 44, as shown in FIG. 3, may be arranged in a diamond-shape with one front wheel 44, two mid-wheels 44, and one rear wheel 44. This configuration provides for the conventional landing gear configuration of short take-off/landing operation and enables the MMV 20a-20d to turn with a small radius of rotation. However, other configurations and arrangements of the tires 44 are also possible.

In other embodiments, each wheel 44 may be rotated via a VTOL fan motor 154 of the vertical thrust systems 32. Generally, the VTOL fans motors 154 may be coupled to a respective and nearby wheel 44 via a mechanical drive train, which is not specifically shown. Thus, the electric hub motors 48 may be eliminated, which reduces the unsprung-mass of the wheel 44, which provides for a desired better ride quality, and, depending on the specific design, may reduce the overall weight of the MMV 20a-20d as well.

The roadable configuration 20a may travel up to about 80 mph on the highway and up to about 30 mph off-road. Road travel speed may be boosted with the rotatable fans 102 of the dual-use thrust system 34, which are described in detail below.

Figure 2B:
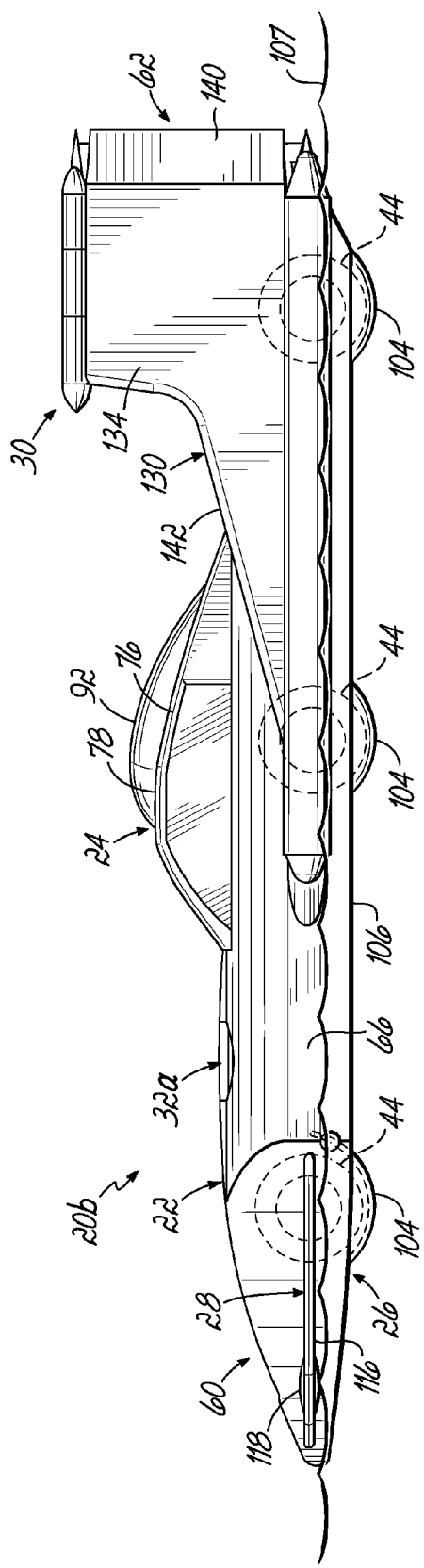
FIG. 2B is a side-elevational view of the multi-modal vehicle of FIG. 1, illustrated in a watercraft configuration.

Referring now to FIG. 2B and also to FIG. 9, the details of the watercraft configuration 20b are described. Conversion of the roadable configuration 20a (FIG. 1) to the watercraft 20b may be accomplished by retracting the wheels 44, such as by way of the suspension system 46 and as would be accomplished in flight. As shown, the wheels 44 may only be partially retracted into stowage within the fuselage 22. Therefore, a slidable cover 104 may be actuated over the stowed wheels 44 by one or more electromechanical actuators 108 (i.e., servo motors) and to seal a bottom surface 106 of the fuselage 22 against the water 107. Furthermore, the bottom surface 106 may be shaped to induce hydroplaning and include a protective polymer coating for protecting the fuselage 22 during water, swamp, grassland, snow, or ice travel.

Referring again to FIGS. 1, 8, and 9, the canard wing system 28 is described with greater detail. The canard wing system 28 includes at least one pair of wings 116 that is positioned toward the front end 60 of the fuselage 22, or more generally forward of the Center of Gravity ("CG"). The wings 116 of the canard wing system 28 may be rotatably coupled to a support 118 at the front end 60 of the fuselage 22 such that rotation occurs within an x-y plane and between a retracted position (such as in the roadable or watercraft configurations 20a, 20b of FIGS. 1 and 2B) and an extended position (such as in the VTOL or aircraft configurations 20c, 20d of FIGS. 7 and 8). Rotation of the wings 116 may be performed by a servo motor 120, which is controlled by the computer 42 and activated from the control panel 68 within the cabin 24.

The wings 116 of the canard wing system 28 may be sized and shaped to provide additional lift to the MMV 20a-20d. Furthermore, each wing 116 may include a control surface 122 to prevent wing stalls by stalling at a lower angle-of-attack than the main wing system 30. The tip vortices that are shed off the canard wing system 28 may increase the main wing's (134 in FIG. 8) lift-to-drag ratio ("L/D").

However, the canard wing system 28 also reduces static stability margin and may increase difficulty in rotation during Conventional Take-Off and Landing ("CTOL") and Short Take-Off and Landing ("STOL"). These drawbacks are offset by the split trailing edge flaps 140 of the main wing system 30.

The main wing system 30, as shown, includes at least one pair of wings 130 that are positioned between the CG and the rear end 62 of the fuselage 22, or more generally positioned between the cabin 24 and the rear end 62.

While the wings 130 may have various designs, the illustrated wing design, when laterally-spread, may include a high-sweep angle delta wing in front of a low-sweep angle conventional wing that is capable of producing LEVs, as described in detail below. The shape is modified such that each wing 130 is foldable and, more specifically, includes an outboard portion 132 and an inboard portion 134, wherein each inboard portion 134 is rotatably coupled to the fuselage 22 and each outboard portion 132 is rotatably coupled to the respective inboard portion 134. Each rotatable portion 132, 134 is operated by a separate servo motor 136, 138 (for the inboard and outboard portions 132, 134, respectively; FIG. 9), controlled by the computer 42, and activated from the control panel 68 within the cabin 24.

In the roadable configuration 20a, as shown in FIGS. 1 and 2A, the outboard portions 132 of the main wing systems 30 are rotated inwardly (i.e., toward the cabin 24) to about 90° relative to the inboard portions 134. The inboard portions 134 are also rotated inwardly, about respective axes that are generally parallel to the x-axis to form a retracted position where the inboard portions 134 are substantially parallel to the z-axis. While not shown, the dihedral angle of the foldable wings 130 may be selected to provide lateral stability in any of the illustrated configurations.

As shown in FIG. 1, when the inboard portions 134 are fully retracted and the outboard portions 132 form a 90° angle with the inboard portions 134, the outboard portions 132 may meet, overlap, or otherwise come within close proximity to one another. Therefore, both the outboard portion 132 and the inboard portion 134 are within close proximity of the ducts 150 of the rotatable fans 102. Though not shown, a latch or other securing mechanism may be used to stabilize and secure the outboard portions 132 and inboard portions 134 to the ducts 150 of the rotatable fans 102, which substantially increases structural rigidity and integrity while reducing air turbulence and noise during land or water travel.

Furthermore, the retracted position of the main wing system 30 shown in FIGS. 1 and 2A helps to shape the wake associated with the MMV design and aid in air flow over the MMV 20a-20d to produce a negative (downward) lift effect. The negative lift effect is generally known to counteract the tendency of a vehicle to leave a surface 137 when traveling at high velocities (indicated by airflow arrows 141) and is represented by downward directed arrows 139. Negative lift effects may also be achieved by other structural elements, for example, including a downwardly-directed angle in the design of the hood. Negative lift effect may also be increased by positioning the inboard portions 134 and the outboard portions 132 of the main wing system 30 at a negative angle of attack while in the roadable vehicle configuration 20a.

In the aircraft configuration 20d, the wings 130 rotate in the direction of arrows 144 so as to extend in a position where the inboard portions 134 substantially lie within the x-z plane with the outboard portions 132. In some embodiments, a slight angle may be formed between the outboard and inboard portions 132, 134 to provide lateral stability.

Each of the inboard and outboard portions 134, 132 may include split trailing edge flaps 140 that are operable as tail elevators, ailerons, or flapperons. Control of the split trailing edge flaps 140 may be through one or more servo motors (not shown) or other known mechanisms. The edge flaps 140 may also be used as air brakes during conventional landing. Though not shown, winglets may be added if desired, to provide additional directional stability and resistance to spin.

To facilitate transformation of the MMV 20a-20d from the VTOL configuration 20c (FIG. 7) or aircraft configuration 20d (FIG. 8) to the roadable configuration 20a (FIG. 1), the main wing system 30 should include low aspect-ratio wings. While conventional low aspect-ratio wings are aerodynamically inefficient with low maximum lift coefficient ($C_{Lmax}$) and low maximum lift-to-drag ratio, $L/D_{max}$, low aspect-ratio delta wings having a high sweep angle may produce lift augmenting LEVs. In some instances, LEVs may increase lift by nearly 100% of the potential lift. Furthermore, delta wings with well-rounded leading edges 142 may also have an $L/D_{max}$ as high as 16 for subsonic flight. Yet, LEVs tend to be highly unstable, unsteady, and very sensitive to in-flight conditions. Therefore, some control techniques are available, such as those in U.S. Pat. No. 6,138,955, issued to Gutmark et al. in 2000, the disclosure of which is incorporated herein by reference.

Referring again to FIG. 1, as well as FIG. 3, the MMV 20a-20d is illustrated with two vertical thrust systems 32, a first vertical thrust system 32a that is forward of the cabin 24 and a second vertical thrust system 32b that is rearward of the cabin 24.

Each of the two vertical thrust systems 32a, 32b of the illustrated MMV 20a-20d includes a pair of VTOL fans 100, each embedded within the fuselage 22 to allow optimization of air flow (indicated by arrow 147) through an inlet 148 and a duct 150. A narrow operating envelope allows each of the VTOL fans 100 to include a series of fixed-pitch blades 152, which reduce the weight and improve the reliability of each of the VTOL fans 100. Each of the VTOL fans 100 is a self-contained assembly having a motor 154, a battery (such as a lithium-based battery), a one degree-of-freedom thrust vector flap 156, and an actuator (not shown) for the vector flap 156. The actuator with the vector flap 156 is operable to provide side force and yawing moment in zero forward flight speed. Rolling and pitching moments in VTOL mode are provided by differential thrust.

The batteries of the VTOL fans 100 are generally rechargeable and are configured to be recharged during in-flight cruise and/or surface driving. In some embodiments, the batteries may include ultra-capacitors, which enables fast charging/discharging; however, ultra-capacitors have a low energy density that is about ten times lower than lithium batteries alone. Battery recharge may be accomplished by an onboard liquid fuel engine-driven electric machine 157 (FIG. 9) that is operable in a generator mode, and the power distribution buses also serve as vehicle structural elements. Accordingly, during in-flight cruise, the fuel engine-driven electric machine 157 (FIG. 9) may recharge the VTOL fan batteries for 7.5 minutes for each minute of VTOL or hover operation. Fully charged batteries may provide four minutes of VTOL or hover operation.

While not shown, some embodiments of the MMV 20a-20d may include only one vertical thrust system 32 positioned forward of the cabin 24; however, two vertical thrust systems 32a, 32b provide the benefit of reduced ground erosion. That is, during vertical takeoff and/or landing, an MMV 20a-20d having only one vertical thrust system 32 focuses the vertically thrusting force onto the surface just below the hood of the MMV 20a-20d. This focusing of vertical force may cause soil, sand, water, or other material comprising the surface to disperse from under the MMV 20a-20d. Sufficient dispersion of the surface may be hazardous not only to passers-by, but may also damage the mechanical systems of the MMV 20a-20d or sufficiently erode the surface. On the other hand, only one vertical thrust system 32 could be used to reduce the overall length of the chassis 26 and the fuselage 22, decrease the overall weight of the MMV 20a-20d, and further improve the fuel efficiency in cruise, at the cost of requiring prepared takeoff and landing surfaces.

The vertical thrust systems 32a, 32b may be laterally- and symmetrically-positioned and spaced to create symmetrical flow fields beneath the MMV 20a-20d, which create favorable fountain effects between adjacent ones of the vertical thrust systems 32a, 32b. Additional favorable fountain effects may exist, to some degree, between longitudinal spaces lying between adjacent rows of the vertical thrust systems 32a, 32b; however, larger longitudinal spacing between vertical thrust systems 32a, 32b may lead to suckdown vortices, which may be alleviated with strategically-located and oriented fins, known as Lift Improvement Devices ("LIDs").

In the VTOL configuration 20c, the MMV 20a-20d may be operated in a manner that is similar to an elevator. For example, for vertical takeoff (indicated by VTOL arrow 160) to a height of about 50 ft or higher, the driver/pilot may select the appropriate knob or button directed to the desired altitude. Once the selected height is achieved, the driver/pilot may steer the MMV 20a-20d into a desired heading and then use the accelerator/decelerator pedals for cruise flight (indicated by forward propulsion arrow 98), which causes the computer 42 (FIG. 9) to transition the MMV 20a-20d from the VTOL configuration 20c to the aircraft configuration 20d. For vertical landing, the driver/pilot may descend to an altitude of less than about 500 ft but more than 50 ft above ground level and then decelerate. Another knob or button may be selected at about 50 ft above ground to initiate the descent, again, in a manner that is similar to an elevator. Steering may be accomplished during the descent. A stop button may prematurely terminate the descent and the MMV 20a-20d will remain in hovering mode at that altitude, for instance, waiting for ground clearance to land.

Figure 7:
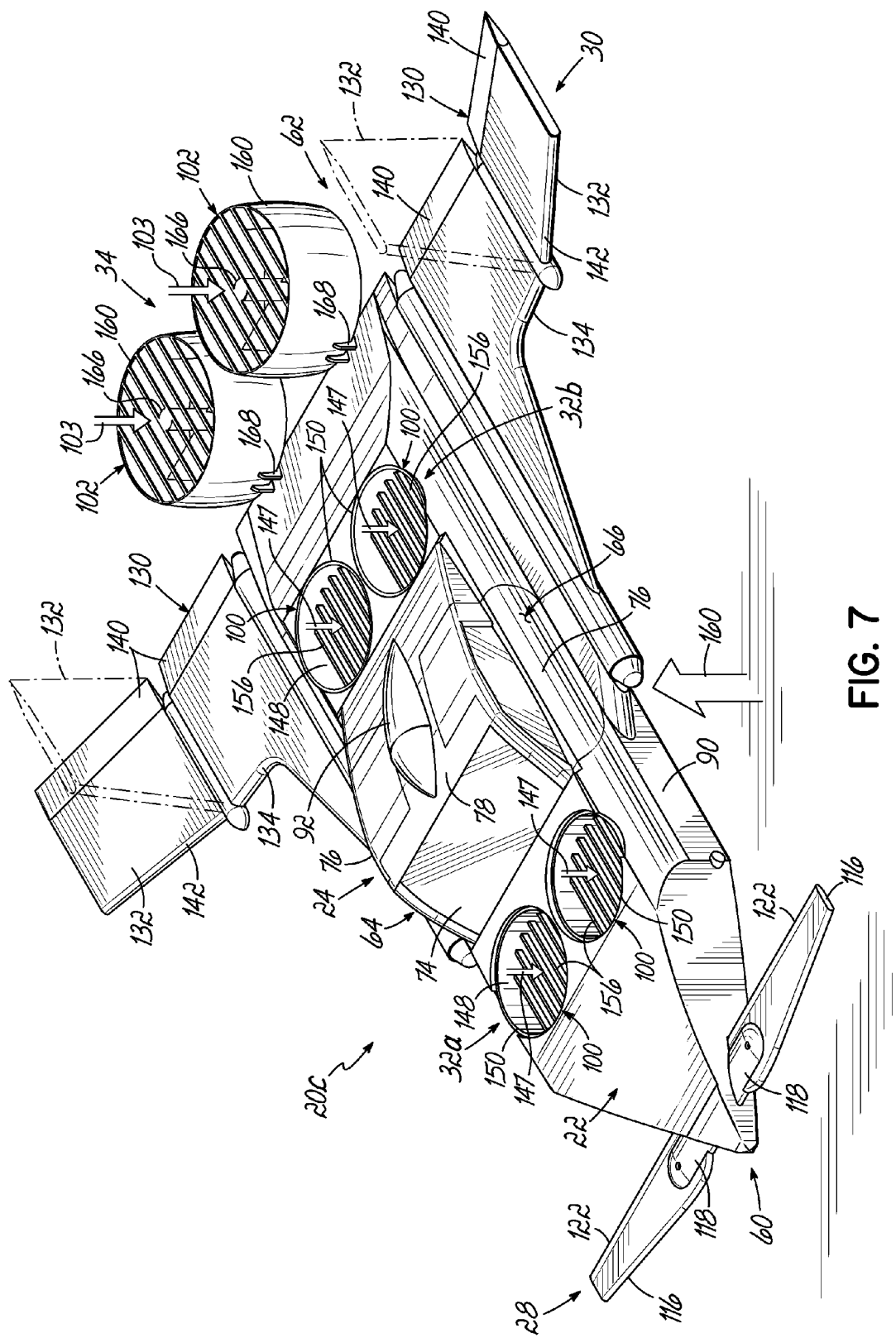
FIG. 7 is an isometric view of the multi-modal vehicle of FIG. 1, illustrated in a Vertical Take Off/Landing ("VTOL") vehicle configuration.
Figure 8:
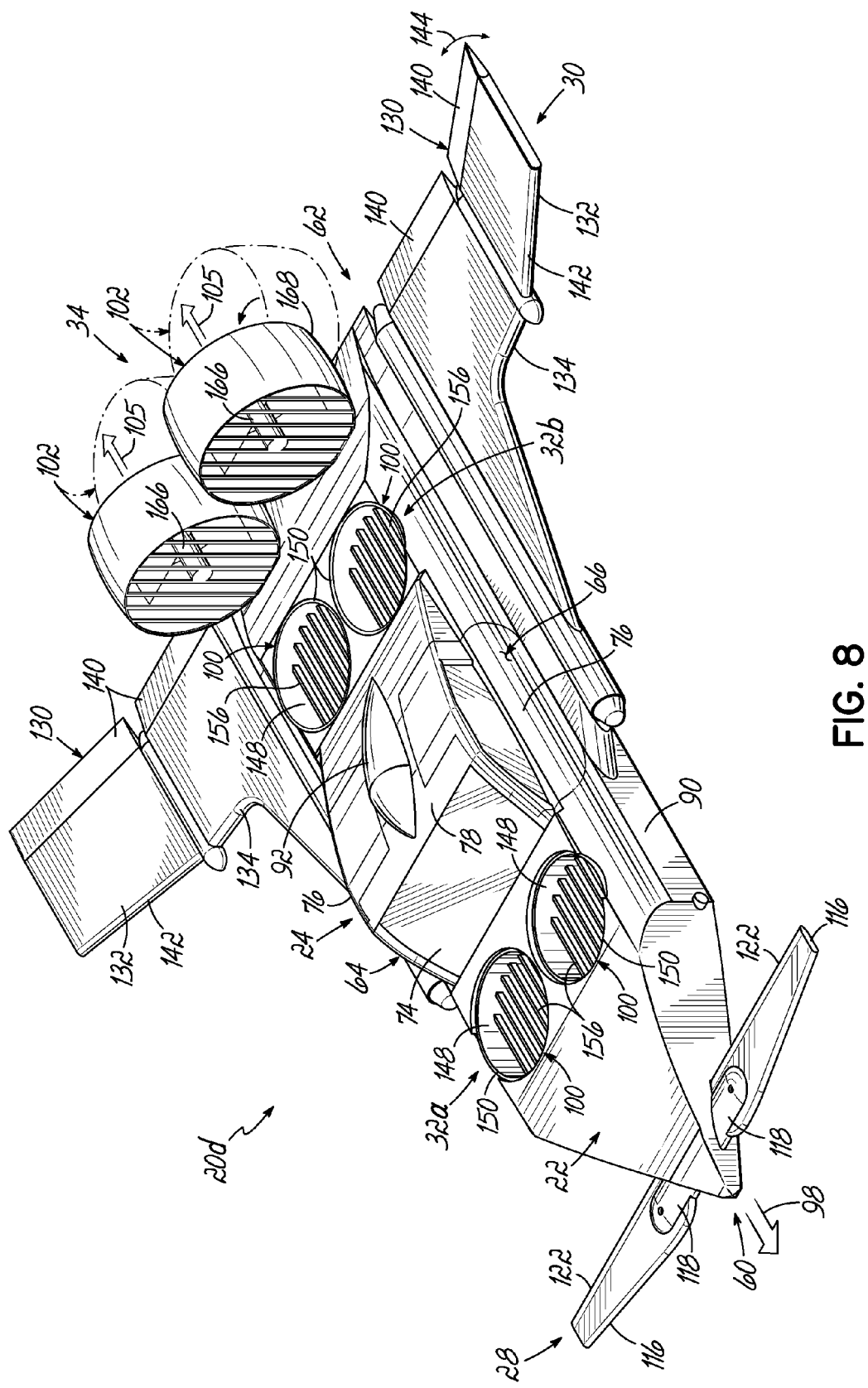
FIG. 8 is an isometric view of the multi-modal vehicle of FIG. 1, illustrated in an aircraft configuration.

Turning now to the details of the dual-thrust systems 34, the MMV 20a-20d may include one or more dual-thrust systems 34, wherein each is comprised of a rotatable fan 102 that is moveable between a first configuration, shown in FIG. 7 with airflow indicated in the direction of arrows 103, positioned for VTOL and a second configuration, shown in FIG. 8 with airflow indicated in the direction of arrow 105, that is positioned for lateral propulsion, such as in the aircraft configuration 20d, the watercraft configuration 20b, or to facilitate surface travel in the roadable configuration 20a.

Each of the rotatable fans 102 includes a variable pitch rotor 162 and variable geometry ducts 164 (FIG. 9), which are operable in VTOL speeds of about 10 ft/s, in-flight cruise speeds of up to 220 ft/s, and speeds therebetween. Each rotatable fan 102 may be powered by an engine 166 (FIG. 9), for example, by a 125 HP heavy fuel engine that is coupled to a 50 HP electric generator. The generators may also provide an electrical drive train in the case of one engine failure, e.g., the generator of the failed engine 166 may be operable as an electric motor to provide partial power to the partially disabled fan, thereby reducing imbalance in yaw moment. The generators may also provide power to the drive motors 48 (FIG. 9) of the wheels 44 (FIG. 2) and may serve as starters for the liquid fuel engine.

Rotation of the rotatable fans 102 about a support 168 may be actuated by the thrust generated by each fan 102 itself and with the rate of rotation controlled by a frictional braking mechanism (not shown). Alternatively, rotation may be accomplished by a separate rotational or servo motor 170 (FIG. 9).

Each of the rotatable fans 102 includes two degrees of freedom thrust vectoring, which provides (1) yaw control in zero forward velocity VTOL and hover flight and (2) roll, pitch, and yaw control during cruise flight. Roll and pitch control authority in zero forward velocity VTOL and hover operation is provided by the thrust differentials of both the vertical thrust systems 32a, 32b and the dual-use thrust system 34. In total, the MMV 20a-20d has six degrees of freedom position and attitude control authority in its VTOL configuration 20c. The thrust differentials and vectoring control effectors are essential in upset recovery and extreme evasive maneuvers. For example, during an upset or extreme maneuvering, the control surfaces may stall and lose control effectiveness. In those instances, the thrust vectoring may be able to maintain or otherwise regain control of the MMV 20a-20d.

Proper placement of the rotatable fans 102 may facilitate the formation of LEVs by the air inlets by inducing favorable downstream suction effects. Moreover, rotation of the rotor 162 in a direction that opposes the direction of the LEVs may reduce the effective angle of attack of the fan blade and further improve the efficiencies of the fans 102.

In total, the illustrated MMV 20a-20d includes six ducted fans 100, 102 that may provide at least a minimal disk loading of 58 lbs/ft$^2$. This level of disk loading allows the MMV 20a-20d to VTOL on almost any surface without significant erosion to the ground. Fast and safe in-flight transition between the power-borne VTOL and air-borne aircraft configurations 20c, 20d may be achieved because only approximately 40% of the MMV's weight is supported by the dual-use thrust system 34. Accordingly, nearly 60% of the total lift is supported by the vertical thrust systems 32a, 32b, which facilitates the fast rotation of the rotatable fans 102 of the dual-use thrust system 34 during transition flight with large operating margins. Comparing to the 100% weight supported by a main thrust system for most, if not all, of known conventional vector thrust VTOL aircraft or similar multi-modal concepts where full forward thrust is reached at stall velocity, the MMV 20a-20d in accordance with various embodiments of this invention may reach full forward thrust at about 60% of the stall velocity, which significantly shortens the time and risk of transition flight. Together, with using batteries for the VTOL fans 100, this configuration significantly reduces the installed power of the liquid fuel engines from the conventional 1200 HP to 1800 HP for this size vehicle to ranging from about 250 HP to about 300 HP.

While the illustrated MMV 20a-20d lacks conventional vertical stabilizers and rudders, the dual-use thrust system 34 may provide directional stability while the thrust vectoring control can generate side force and yawing moment that is similar to a conventional rudder.

Figure 10:
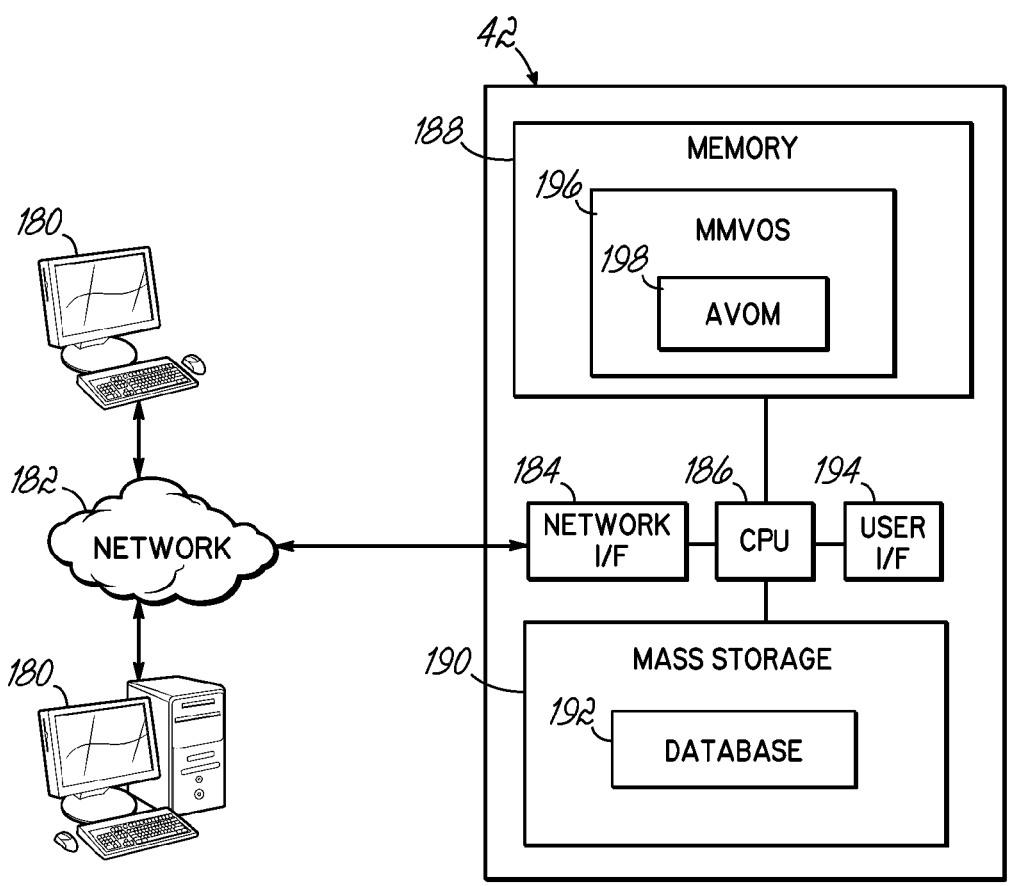
FIG. 10 is a schematic illustration of a computer configured to operate a multi-modal vehicle in accordance with one embodiment of the invention.

Turning now to FIG. 10, the details of the computer 42 for operating and/or controlling various electrical and operational components of the MMV 20a-20d are described. The computer 42 that is shown in FIG. 9 may be considered to represent any type of computer, computer system, computing system, server, disk array, or programmable device such as multi-user computers, single-user computers, handheld devices, networked devices, or embedded devices, etc. The computer 42 may be implemented with one or more networked computers 180 using one or more networks 182, e.g., in a cluster or other distributed computing system through a network interface (illustrated as "NETWORK I/F" 184). The computer 42 will be referred to as "computer" 42 for brevity's sake, although it should be appreciated that the term "computing system" may also include other suitable programmable electronic devices consistent with embodiments of the invention.

The computer 42 typically includes at least one processing unit (illustrated as "CPU" 186) coupled to a memory 188 along with several different types of peripheral devices, e.g., a mass storage device 190 with one or more databases 192, an input/output interface (illustrated as "I/O I/F" 194), and the Network I/F 184. The memory 188 may include dynamic random access memory (DRAM), static random access memory (SRAM), non-volatile random access memory (NVRAM), persistent memory, flash memory, at least one hard disk drive, and/or another digital storage medium. The mass storage device 190 is typically at least one hard disk drive and may be located externally to the computer 42, such as in a separate enclosure or in one or more networked computers 180, one or more networked storage devices (including, for example, a tape or optical drive), and/or one or more other networked devices (including, for example, a server).

The CPU 186 may be, in various embodiments, a single-thread, multi-threaded, multi-core, and/or multi-element processing unit (not shown) as is well known in the art. In alternative embodiments, the computer 42 may include a plurality of processing units that may include single-thread processing units, multi-threaded processing units, multi-core processing units, multi-element processing units, and/or combinations thereof as is well known in the art. Similarly, the memory 188 may include one or more levels of data, instruction, and/or combination caches, with caches serving the individual processing unit or multiple processing units (not shown) as is well known in the art.

The memory 188 of the computer 42 may include an integrated Multi-Modal Vehicle Operating System (illustrated as "MMVOS" 196) to automate and control the primary operation of the MMV 20a-20d (FIG. 1) via the computer 42 in a manner that is described in detail below. The memory 188 may also include at least one application, or other software program, otherwise referred to herein as an Autonomous Vehicle Operation Manager ("AVOM" 198), which is configured to execute in combination with the MMVOS 196 and automatically perform all tasks associated with operation and transition of the MMV 20a-20d (FIG. 1) as described above with or without accessing further information or data from the database(s) 192 of the mass storage device 190.

Those skilled in the art will recognize that the environment illustrated in FIG. 10 is not intended to limit the present invention. Indeed, those skilled in the art will recognize that other alternative hardware and/or software environments may be used without departing from the scope of the invention.

Figure 11:
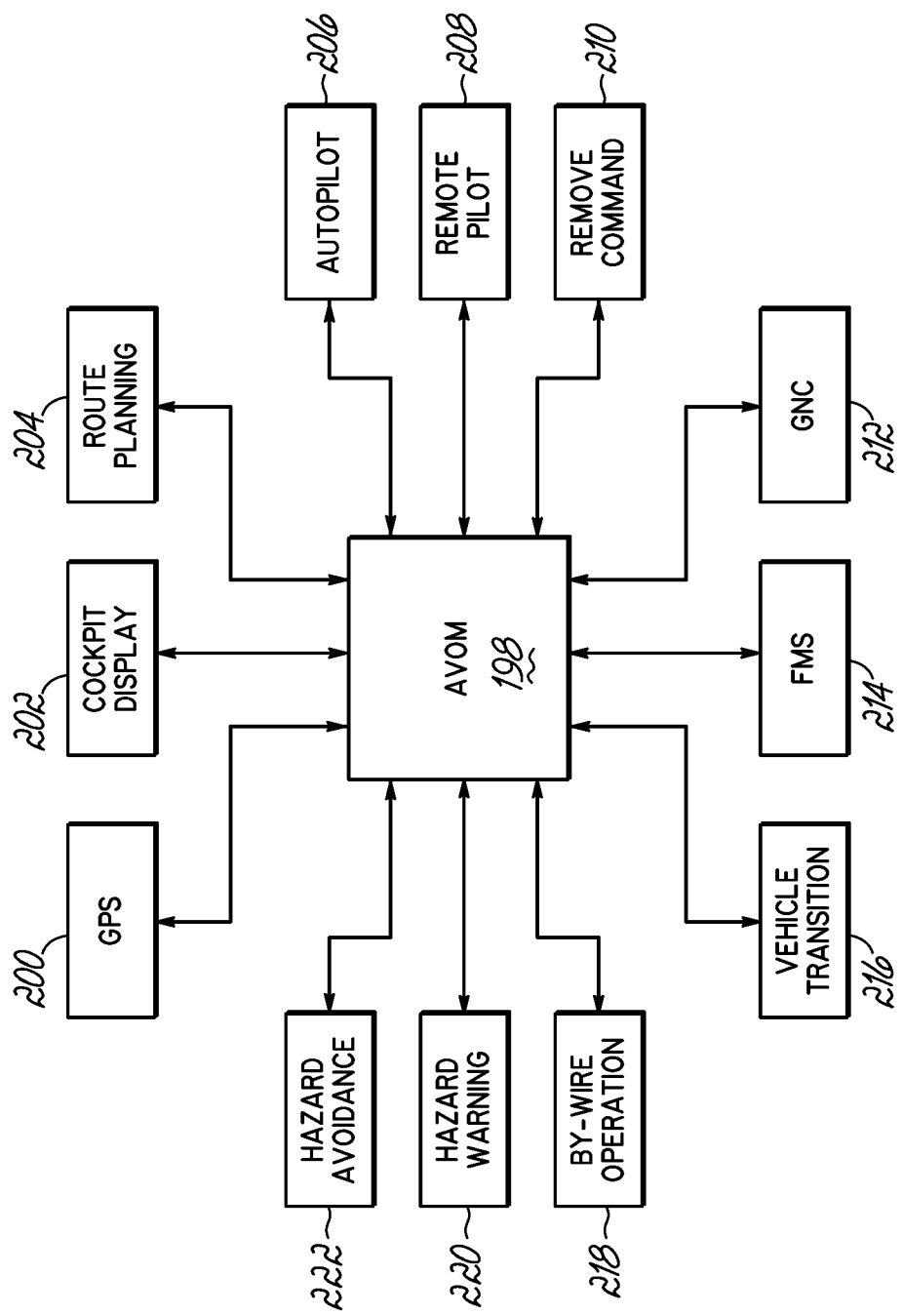
FIG. 11 is a schematic illustration of various modules for operating a multi-modal vehicle in accordance with one embodiment of the invention.

In general, the routines executed to implement the embodiments of the invention, whether implemented as part of the operating system or a specific application, component, algorithm, program, object, module or sequence of instructions, or even a subset thereof, will be referred to herein as computer program code or simply program code. For simplicity, each is referred to hereinafter as a "module" that may be included in the AVOM 198. Specifically, and as shown in FIG. 11, the AVOM 198 may include, for example, one or more of the following: a Global Positioning System ("GPS") module 200, a cockpit display module 202, a route planning module 204, an autopilot module 206, a remote pilot module 208, a remote command module 210, a Guidance/Navigation/Control module ("GNC") 212, a Flight Management System ("FMS") module 214, a vehicle transition module 216, one or more by-wire operation modules 218, a hazard warning module 220, and a hazard avoidance module 222 just to name a few.

Figure 12A:
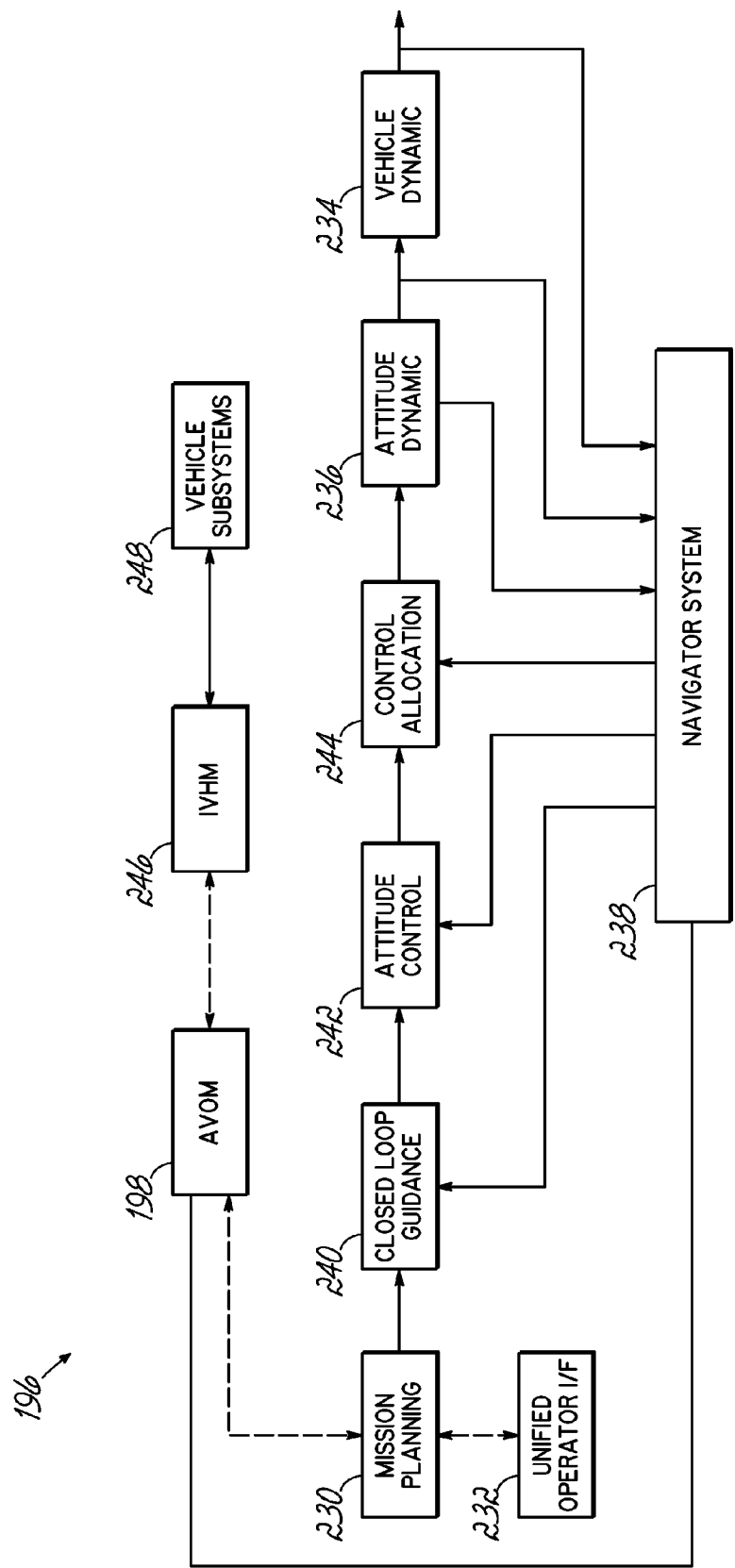
FIGS. 12A and 12B are schematic illustrations of a multi-modal vehicle operating system in accordance with one embodiment of the invention.

Turning now to FIG. 12A, the architecture of the MMVOS 196 is described in more detail. Specifically, the MMVOS 196 includes the AVOM 198 to enable crew-commanded or crew-piloted operations from within the cabin 24 (FIG. 1), remotely-piloted operation from outside the cabin 24 (FIG. 1) but within sight of the MMV 20a-20d (FIG. 1), or via virtual reality for video feedback, and remotely commanded autonomous operation. The AVOM 198 receives: mission planning information (Block 230) and operational commands from the crew via the unified operator interface ("Unified Operator I/F" 232); vehicle dynamic states 234 (including velocity, position, attitude, angular velocity, environmental information, and situation information) and attitude dynamics 236 from the navigation system 238; closed-loop guidance (Block 240) and attitude (Block 242) controller states and control allocation effectors (Block 244) commands; and an MMV health and safety status from the Integrated Vehicle Health Management (IVHM) system 246, which evaluates all of the MMV subsystems (Block 248). In accordance with this latter function, the AVOM 198 is configured to determine whether the MMV 20a-20d (FIG. 1) is operating under a normal state, an upset (uncontrollable falling and tumbling cause by adverse air flows or pilot mistake) state, or in a failure state. From the information received and the determination, the AVOM 198 may also determine the mode in which the MMV 20a-20d (FIG. 1) is operating (roadable 20a, VTOL 20c, aircraft 20d, and watercraft 20b). The AVOM 198 may then initiate upset recovery controller adaptation, or undergo fault tolerant control reconfiguration under benign failure mode, and execute the abort procedure and eject the escape pod 24 (FIG. 1) in case of non-recoverable failure mode. Based on the inputs, observations, and determinations, the AVOM 198 may further modify the Mission Planning (Block 230) by calculating the optimal motion trajectories, and/or the Guidance and Control Algorithms ("GCA") 250, as described with reference to FIG. 12B.

Figure 12B:
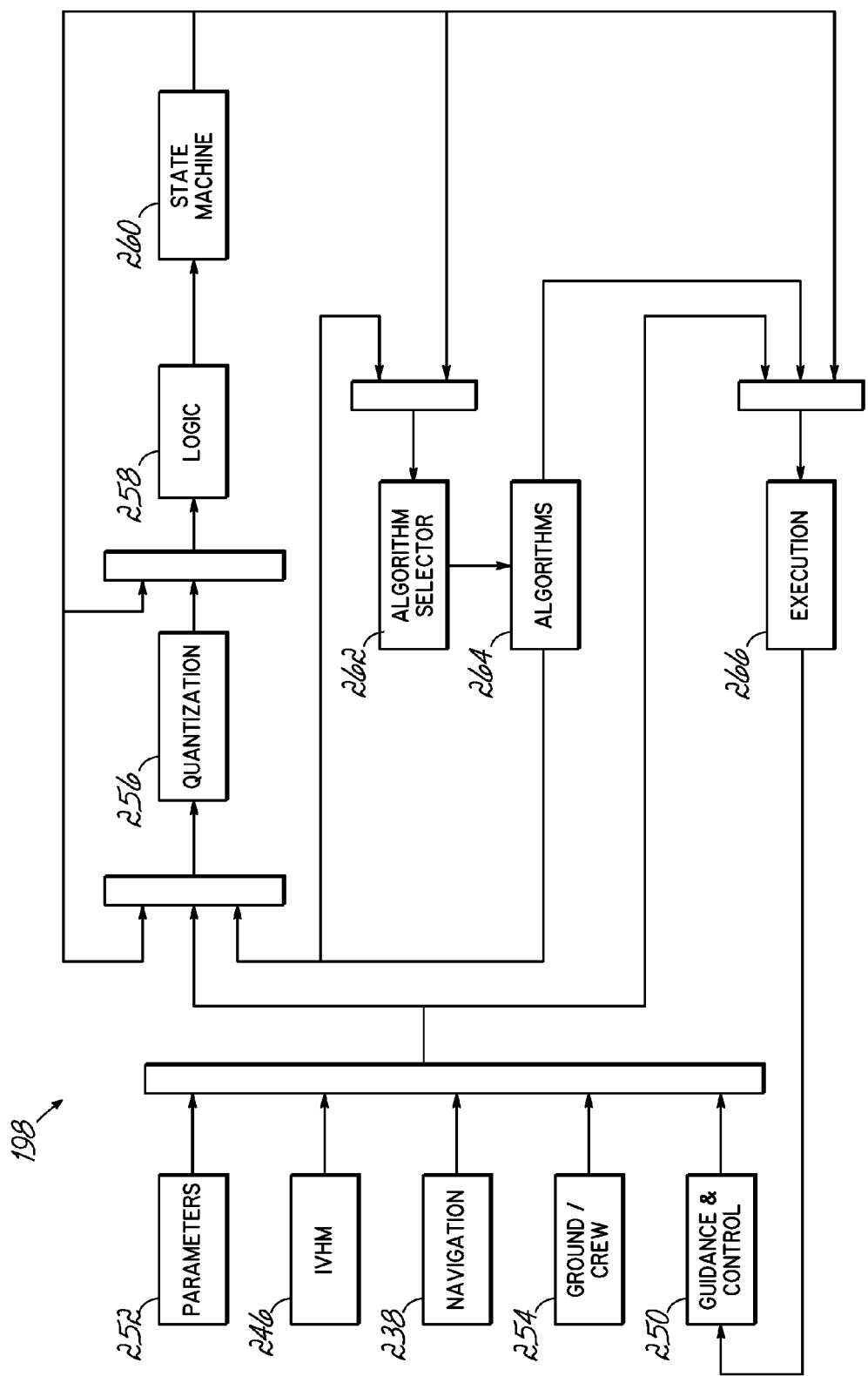

So, turning now to FIG. 12B, still further details of the AVOM 198 are provided. While the Mission Planning (Block 230) above determines the optimal motion trajectories for travel, the GCA 250 tracks the optimal trajectory precisely with exponential stability and robustness to regular and singular perturbations and external disturbances. Accommodation of perturbations or external disturbances is achieved by adaptively adjusting the controller gains with stability guaranty. Recoveries of MMV 20a-20d (FIG. 1) upsets and benign faults are accomplished by a combination of strategies including trajectory re-planning, control allocation reconfiguration, and controller gain adaptation.

In effect, various inputs are used, including one or more MMV parameters (Block 252), information from the IVHM (Block 246), information regarding navigation (Block 238), directives and orders provided by the ground and/or crew (Block 254), and also the current state of the GCA (Block 250). Briefly, these inputs may be digitized and compared with preset threshold values for abnormalities (Quantization Block 256). Abnormal values are then considered, according to a preset logic, for diagnosis and fault identification (Block 258). The State Machine provides data on the operational states of all of the critical components of the MMV 20a-20d (Block 260). During a fault identification, the fault status of the critical components are directed to an algorithm selector (Block 262) where an appropriate correction algorithm is determined (Block 264). The determined algorithm is then executed (Block 266). After execution, the data from the State Machine (Block 260) and the determined algorithm (Block 264) are used to update the thresholds for further quantization (Block 256).

Figure 13:
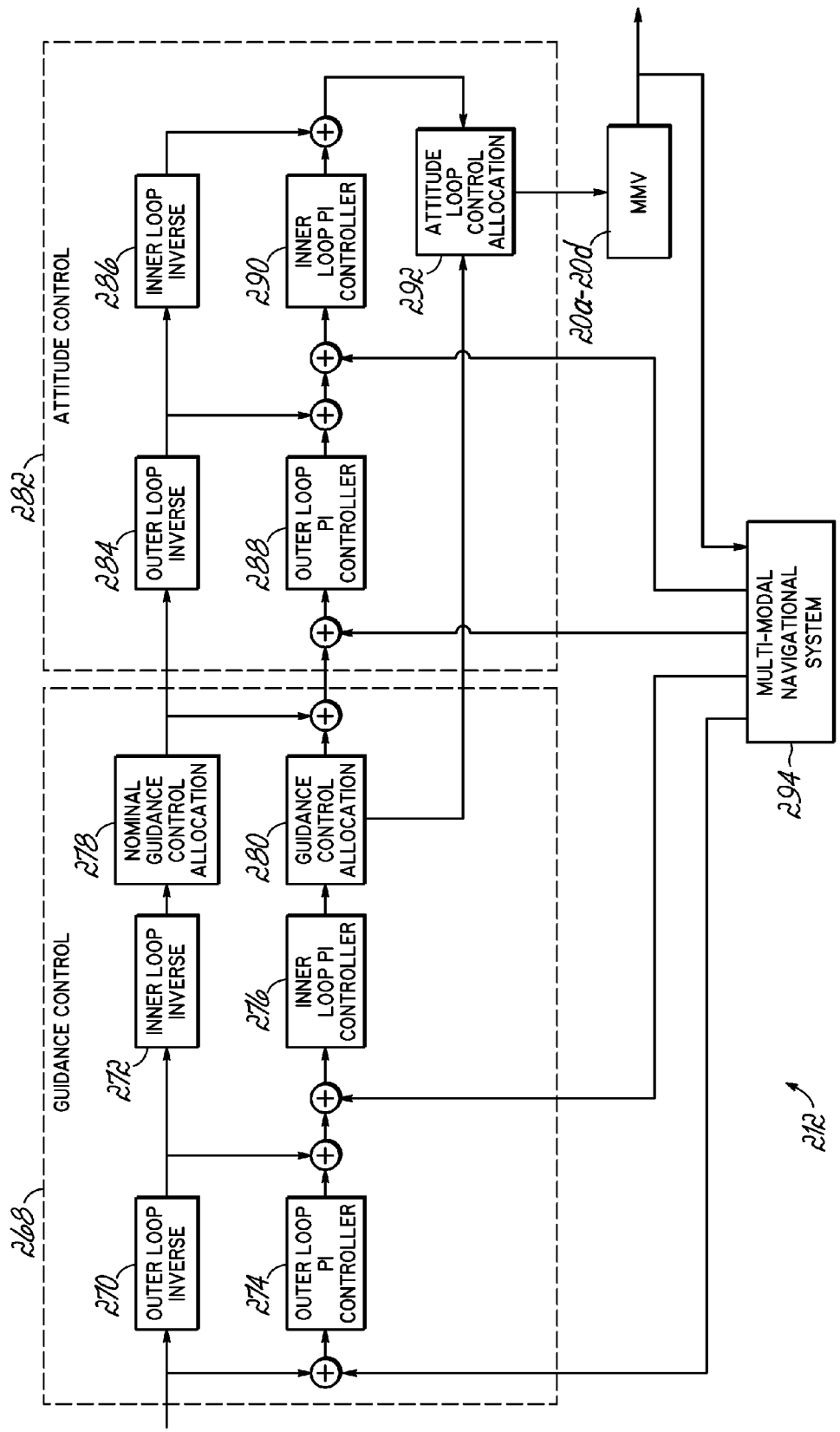
FIG. 13 is a schematic illustration of a multi-modal flight control and navigational system in accordance with one embodiment of the invention.

Turning now to FIG. 13, the GNC 212 may be described in greater detail. The GNC 212 is built on relational databases containing all relevant vehicle data, such as mass, reference geometric parameters, aerodynamics data, propulsion configuration and property data, control effectors configuration and property data, nominal operation modules and mission specific data, critical vehicle subsystem and component failures modes and symptoms, and fault mitigation knowledge base. As shown, the GNC 212 may combine the translational trajectory tracking components of the guidance system with the attitude tracking of the flight controller (GCA 250) into a six degrees-of-freedom tracking controller and is based on Trajectory Linearization Control ("TLC"). Additional details of the TLC are available in co-pending PCT Patent Application No. PCT/US10/28632, published as WO 2010/138236, the disclosure of which is incorporated herein by reference in its entirety. TLC provides advanced control technique for Non-Linear, Time-Varying ("NLTV") dynamics and highly integrated, modular, and unified multi-modal operations such that only the control allocation components differ from one another during operation in any one particular mode of the MMV. The standard nonlinear rigid body kinematics and dynamics models of the MMV 20a-20d are used for the TLC VTOL, transition, and cruise flight controllers.

While not provided in detail, it would be readily appreciated that the MMV 20a-20d may include a navigational system that is operable in each configuration 20a-20d and during those situations in which situation awareness is impaired or limited. Accordingly, the MMV 20a-20d may include a plurality of sensors and/or monitors that, in accordance with one or more algorithms and processors, can estimate the location and/or position of the MMV 20a-20d.

EXAMPLE 1

According to one simulation, a four passenger MMV having two vertical thrust systems was constructed to have a maximum takeoff weight of 1500 kgf (3300 lbs) in accordance with an embodiment of the present invention. The MMV provided passenger entry by way of two swing-up side entry doors (each 2 m or 7 ft wide). The MMV included a 4-wheel drive electric drive train with a 25 cm (10 in) ground clearance and a 100 L (25 gal) fuel tank. A Lithium battery (LiFePO$_4$) of 570 N (130 lbs) provided 20 kWh of battery energy for two VTOL cycles (total 4 min) at a maximum vertical velocity of 1 m/s (3.3 ft/s). Recharging for one VTOL (2 min) cycle occurred within 15 min. The MMV traveled on land at speeds of up to 80 mph and airborne flight cruise speeds of up to 150 mph (at 75% power: 240 km/h or 130 kt). In addition to VTOL, the MMV was also capable of Conventional Take-Off and Landing ("CTOL") and Short Take-Off and Landing ("STOL"). For CTOL, takeoff distance of up to 475 m (1560 ft) was required with a rate of climb (at sea level) of 6.6 m/s (1300 ft/min); a landing distance of about 518 m (1700 ft) was required. The flight ceiling was 3048 m (10,000 ft) and the travel range at 65% power was about 463 km (250 nm). Additional parameters are as follows:

| Specification | Four Passenger cabin with two vertical thrust systems |
|---|---|
| Fuselage & Wings | |
| Length | 8.2 m (27 ft) |
| Height | 1.98 m (6.5 ft) |
| Width | 2.59 m (8.5 ft) |
| Cabin/Escape pod dimensions (w, l, h) | 1.52 m, 2.44 m, 1.1 m (5 ft, 8 ft, 3.6 ft) |
| Main wing span | 7.3 m (24 ft) |
| Canard wing span | 4.88 m (16 ft) |
| Main wing area | 13.94 m$^2$ (150 ft$^2$) |
| Canard wing area | 2.32 m$^2$ (25 ft$^2$) |
| Total wing area | 16.26 m$^2$ (175 ft$^2$) |
| Wing loading | 92.77 kg/m$^2$ (19 lbs/ft$^2$) |
| Empty weight | 953 kg (2100 lbs) |
| Vertical Thrust System (4 fans) | |
| Diameter of each fan | 1 m (3.3 ft) |
| Thrust force per fan | 2181 N (490 lbs) |
| Disk loading | 2777 N/m$^2$ (58 lbs/ft$^2$) |
| Power per fan | 60 kW (80 HP) |
| Dual-Use Thrust System | |
| Diameter of each fan | 1.2 m (4 ft) |
| Thrust force per fan | 3139 N (717 lbs) |
| Disk loading | 2775 N/m$^2$ (58 lbs/ft$^2$) |
| Power per fan | 110 kW (150 HP) |
| Power Plant | |
| Wheel motors | Four 25 kW (34 HP) electric hub motors |
| Vertical thrust system motors | Four 60 kW (80 HP) electric motors |
| Dual-use thrust system motors | Two 110 kW (150 HP) diesel (rotary) engines each coupled with a 60 KW (80 HP) electric generator |
| Additional Details | |
| Fuel weight for 250 nm | 91 kg (200 lbs) |
| Payload weight | 454 kgs (1000 lbs) |
| Cruise speed at 75% power | 240 km/h (130 kt, or 150 mph) |
| Range at 65% power | 463 km (250 nm) |

EXAMPLE 2

According to another simulation, a two passenger MMV having one vertical thrust system was constructed to a maximum takeoff weight of 1000 kgf (2200 lbs) in accordance with an embodiment of the present invention. The MMV provided passenger entry by way of two swing-up side entry doors (each 1.2 m or 4 ft). The MMV included a 4-wheel drive electric drive train with a 25 cm (10 in) ground clearance and a 80 L (20 gal) fuel tank. A Lithium battery (LiFePO$_4$) of 270 N (65 lbs) shown to provide 10 kWh of battery energy for two VTOL cycles (total 4 min) at a maximum vertical velocity of 1 m/s (3.3 ft/s). Recharging for one VTOL cycle (2 min) occurred within 15 min. The MMV traveled on land at speeds of up to 80 mph and airborne flight cruise speeds of up to 225 mph (at 75% power: 360 km/h or 195 kt). In addition to VTOL, the MMV was also capable of CTOL and STOL. For CTOL, a takeoff distance of up to 230 m (750 ft) was required with a rate of climb (at sea level) of 6.6 m/s (1300 ft/min); a landing distance of about 362 m (1185 ft) was required. The flight ceiling was 3048 m (10,000 ft) and the travel range at 65% power was about 463 km (250 nm). Additional parameters are as follows:

| Specification | Two Passenger Cabin with one vertical thrust system |
|---|---|
| Fuselage & Wings | |
| Length | 6.0 m (20 ft) |
| Height | 1.98 m (6.5 ft) |
| Width | 2.59 m (8.5 ft) |
| Cabin/Escape pod dimensions (w, l, h) | 1.52 m, 1.22 m, 1.1 m (5 ft, 4 ft, 3.6 ft) |
| Main wing span | 7.3 m (24 ft) |
| Canard wing span | 4.88 m (16 ft) |
| Main wing area | 13 m$^2$ (141 ft$^2$) |
| Canard wing area | 2.32 m$^2$ (25 ft$^2$) |
| Total wing area | 15.32 m$^2$ (165 ft$^2$) |
| Wing loading | 65.27 kg/m$^2$ (13.3 lbs/ft$^2$) |
| Empty weight | 699 kg (1540 lbs) |
| Vertical Thrust System (2 fans) | |
| Diameter of each fan | 1 m (3.3 ft) |
| Thrust force per fan | 2049 N (460 lbs) |
| Disk loading | 2609 N/m$^2$ (55 lbs/ft$^2$) |
| Power per fan | 60 kW (80 HP) |
| Dual-Use Thrust System | |
| Diameter of each fan | 1.2 m (4 ft) |
| Thrust force per fan | 2950 N (663 lbs) |
| Disk loading | 2609 N/m2 (55 lbs/ft$^2$) |
| Power per fan | 110 kW (150 HP) |
| Power Plant | |
| Wheel motors | Four 15 kW (20 HP) electric hub motors |
| Vertical thrust system motors | Two 60 kW (80 HP) electric motors |
| Dual-use thrust system motors | Two 110 kW (150 HP) diesel (rotary) engine coupled to a 60 kW (80 HP) electric generator |
| Additional Details | |
| Fuel weight for 250 nm | 71 kgf (160 lbs) |
| Payload weight | 454 kgf (1000 lbs) |
| Cruise speed at 76% power | 360 km/h (195 kt, or 225 mph) |
| Range at 65% power | 463 km (250 nm) |

As provided in detail above, an MMV has been described that is capable of overcoming the known difficulties of VTOL-capable MMVs by carrying passengers with a payload of up to about 1000 lbs (about 453 kg), drives like an SUV, is configured for vertical takeoff and landing, flies at high speed with wing-borne fuel efficiency, and is capable of runway take off from land, as well as operating on water, snow, ice, swamp, and/or grasslands.

While the present invention has been illustrated by a description of various embodiments, and while these embodiments have been described in some detail, they are not intended to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with methods of practicing the present invention as currently known. However, the invention itself should only be defined by the appended claims.

What is claimed is:

1. A multi-modal vehicle ("MMV") configured to operate as a roadable vehicle on land, a vertical takeoff and landing ("VTOL") vehicle, an aircraft vehicle, and a watercraft vehicle on water, swamp, grassland, snow, or ice, the MMV comprising:
a fuselage;
a chassis coupled to the fuselage and supporting at least three wheels in a deployed position and in a stowed position;
a canard wing system supported on the fuselage;
a main wing system simported on the fuselage, wherein the main wing system further comprises:
an inboard portion pivotally connected to the fuselage, and an outboard portion pivotally connected to the inboard portion;
a first vertical thrust system including a pair of ducted fans incorporated within the fuselage;
a dual-use thrust system coupled to a rear portion of the fuselage and configured to transition between a first position for supplying a vertical thrust during a vertical takeoff or landing and a second position for supplying a horizontal thrust during an airborne cruise; and
a controller configured to automatically control at least one of the MMV operations, reconfigurations, and transitions.

2. The MMV of claim 1 further comprising:
a passenger cabin that is configured to be detachable from the fuselage as an escape pod.

3. The MMV of claim 2, wherein the passenger cabin further comprises:
an emergency deployment system having a parachute, at least one suspension spring, or at least one inflatable airbag, or a combination thereof, the emergency deployment system configured to be deployed from the escape pod during an emergency.

4. The MMV of claim 2, wherein the passenger cabin is detachable by detonating one or more explosive latches.

5. The MMV of claim 2, wherein the passenger cabin further comprises:
a unified operating interface including a steering wheel configured to turn so as to cause the MMV to turn on a surface or within the air, the steering wheel further configured to be pushed or pulled so as to cause the MMV to climb or glide within the air, respectively, an accelerator pedal so as to cause the MMV to accelerate, and a decelerator pedal so as cause the MMV to decelerate and to stop.

6. The MMV of claim 1, wherein the controller further comprises:
a multi-modal vehicle operating system for automating the control of the MMV.

7. The MMV of claim 6, wherein the multi-modal vehicle operating system is configured to control at least one of a crew-commanded or crew-piloted operation, a remotely-piloted operation, a remotely-commanded autonomous operation, and an autonomous vehicle operation manager including a guidance system, a navigation system, a control system, a flight management system, a vehicle transition system, and an emergency deployment system.

8. The MMV of claim 1 further comprising:
a second vertical thrust system including a pair of ducted fans incorporated within the fuselage.

9. The MMV of claim 1, wherein the inboard and outboard portions of the main wing system each include a moveable split trailing edge.

10. The MMV of claim 1 further comprising:
one or more electromechanical actuators configured to do at least one of the following:
(i) rotate the canard wing system between the roadable vehicle and the VTOL vehicle or the aircraft vehicle;
(ii) rotate the outboard portion of the main wing system relative to the inboard portion;
(iii) rotate the inboard portion of the main wing system relative to the fuselage;
(iv) rotate the dual-use thrust system between the first and second positions;
(v) adjust a moveable split trailing edge of the inboard portion or the outboard portion or both of the main wing system so as to cause the MMV to climb, descend, or turn within the air;
(vi) adjust a moveable trailing edge of the canard wing system so as to cause the MMV to climb, descend, or turn within the air;
(vii) adjust one or more thrust vectors from the vertical thrust system and the dual-use thrust system so as to stabilize and to control the MMV during VTOL and transition flight or to recover from a vehicle upset;
(viii) adjust angles of the at least three wheels relative to the chassis so as to turn the MMV on a surface;
(ix) move the at least three wheels between the deployed position and the stowed position;
(x) slide a cover about each of the at least three wheels in the stowed state so as to reduce drag and waterproof a bottom portion of the MMV;
(xi) move a louver or an iris or both of the ducted fans of the first vertical thrust system to an open position during VTOL or to a closed position to reduce drag and to protect the ducted fans; and
(xii) adjust a throttle of a liquid-fuel engine.

11. The MMV of claim 10, wherein the electromechanical actuator is a servo motor, a MEMS device, a shape memory alloy device, a piezoelectric device, an electro-strictive device, a magneto-strictive device, or any applicable smart material-based actuator.

12. The MMV of claim 1 further comprising:
a hub motor powered by an onboard generator and a rechargeable battery for each of the at least three wheels, the hub motor configured to provide a horizontal motion of the MMV on a surface;
a rotor motor powered by a rechargeable battery for each of the ducted fans of the first vertical thrust system, the rotor motor configured to provide a vertical motion of the MMV by rotating a fan blade of the ducted fans;
a liquid-fuel engine configured to operate the dual-use thrust system to further provide the horizontal thrust, the vertical thrust, or to transition the dual-use thrust system between the first and second positions; and
an electrical machine powered by the liquid-fuel engine, the electrical machine configured to operate as a generator to charge a VTOL battery, operate the at least three wheels, or power the dual-use thrust system from an onboard generator or a battery if an engine of the dual-use thrust system fails, or a combination thereof.

13. The MMV of claim 1, wherein the dual-use thrust system comprises a pair of fans having a variable duct there-through and a variable pitch rotor therein so as to optimize fuel efficiency and to maximize cruise velocity.

14. The MMV of claim 13, wherein the pair of fans is positioned relative to the main wing system so as to promote main wing system leading edge vortices by creating a trailing edge suction.

15. The MMV of claim 14, wherein blades of the pair of fans are configured to rotate in a direction that opposes the leading edge vortices so as to improve propulsion efficiency.

16. A method of transitioning the MMV of claim 1 from the VTOL vehicle to the aircraft vehicle, the method comprising:
supplying a first vertical thrust from the first vertical thrust system and a second vertical thrust from the dual-use thrust system;
providing a vectored thrust that transitions the second vertical thrust from the dual-use thrust system in the first position to a horizontal thrust from the dual-use thrust system in the second position; and
terminating the first vertical thrust.

17. The method of claim 16, wherein supplying the first and second vertical thrusts and providing the vectored thrust includes automatically controlling the supplying of the first and second vertical thrusts so as to maintain a stability of the MMV and automatically controlling the providing of the vectored thrust so as to further maintain the stability of the MMV.

18. The method of claim 16 further comprising: supplying a third vertical thrust from a second vertical thrust system.

19. A method of transitioning the MMV of claim 1 from the aircraft vehicle to the VTOL vehicle, the method comprising:
providing a vectored thrust that transitions a horizontal thrust from the dual-use thrust system in the second position to a first vertical thrust from the dual-use thrust system in the first position; and
supplying a second vertical thrust from the first vertical thrust system.

20. The method of claim 19 further comprising:
supplying a third vertical thrust from a second vertical thrust system.

21. The method of claim 19, wherein supplying the first and second vertical thrusts and providing the vectored thrust each respectively includes automatically controlling the supplying of the first and second vertical thrusts so as to maintain a stability of the MMV and automatically controlling the providing of the vectored thrust so as to further maintain the stability of the MMV.

22. A method of transitioning the MMV of claim 1 from the roadable vehicle to the VTOL vehicle, the method comprising:
unfolding the main wing system such that the inboard portion is substantially parallel to a horizontal plane of the fuselage; and
rotating the dual-use thrust system to the first position.

23. The method of claim 22 further comprising:
unfolding the outboard portion to be substantially co-planar with the inboard portion.

24. A method of transitioning the MMV of claim 1 from the VTOL vehicle to the roadable vehicle, the method comprising:
rotating the dual-use thrust system to the second position; and
folding the main wing system such that the inboard portion is substantially orthogonal to a horizontal plane of the fuselage and the outboard portion is substantially orthogonal to the inboard portion.

25. A method of transitioning the MMV of claim 1 from the aircraft vehicle to the roadable vehicle, the method comprising:
deploying the at least three wheels from the stowed position to the deployed position; and
folding the main wing system such that the inboard portion is substantially orthogonal to a horizontal plane of the fuselage and the outboard portion is substantially orthogonal to the inboard portion.

26. A method of transitioning the MMV of claim 1 from the roadable vehicle to the aircraft vehicle, the method comprising:
unfolding the main wing system such that the inboard portion is substantially parallel to a horizontal plane of the fuselage and the outboard portion is substantially co-planar with the inboard portion.

27. The method of claim 26 further comprising:
extending the at least three heels from the deployed position to increase a ground clearance for conventional takeoff and landing;
stowing the at least three wheels from the deployed position to the stowed position when in flight.

28. A method of transitioning the MMV of claim 1 from the roadable vehicle to the watercraft vehicle, the method comprising:
stowing the at least three wheels from the deployed position to the stowed position; and
sliding a cover over each of the at least three wheels in the stowed position so as to waterproof a bottom portion of the MMV.

29. A method of transitioning the MMV of claim 1 from the watercraft vehicle to the roadable vehicle, the method comprising:
retracting a cover from each of the at least three wheels so as to expose each of the at least three wheels;
deploying the at least three wheels from the stowed position to the deployed position; and
extending the at least three wheels from the deployed position to increase a ground clearance.

* * * * *

UNITED STATES PATENT AND TRADEMARK OFFICE
CERTIFICATE OF CORRECTION

PATENT NO. : 9,132,915 B2  
APPLICATION NO. : 13/696699  
DATED : September 15, 2015  
INVENTOR(S) : Jianchao Zhu Page 1 of 1

It is certified that error appears in the above-identified patent and that said Letters Patent is hereby corrected as shown below:

In the Specification:

In Col. 5, line 65, "20bmay" should be --20b may--.

In the Claims:

In Col. 15, line 19, Claim 1, "simported" should be --supported--.

In Col. 15, line 21, Claim 1, "fuselage," should be --fuselage;--.

In Col. 17, lines 21-22, Claim 17, insert --each respectively-- between "thrust" and "includes".

In Col. 18, line 31, Claim 27, "heels" should be --wheels--.

Signed and Sealed this
Fifteenth Day of March, 2016

Michelle K. Lee
*Director of the United States Patent and Trademark Office*